(12) United States Patent
Bardagjy et al.

(10) Patent No.: US 10,466,360 B1
(45) Date of Patent: Nov. 5, 2019

(54) DEPTH MEASUREMENT USING SCANNING DIFFRACTIVE OPTICAL ELEMENTS

(71) Applicant: Facebook Technologies, LLC, Menlo Park, CA (US)

(72) Inventors: Andrew Matthew Bardagjy, Fremont, CA (US); Joseph Duggan, San Francisco, CA (US); Cina Hazegh, Walnut, CA (US); Fei Liu, San Jose, CA (US); Mark Timothy Sullivan, Mountain View, CA (US); Simon Morris Shand Weiss, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 134 days.

(21) Appl. No.: 15/693,331

(22) Filed: Aug. 31, 2017

(51) Int. Cl.
*G01S 17/89* (2006.01)
*G02B 27/42* (2006.01)
*H04N 5/225* (2006.01)

(52) U.S. Cl.
CPC .......... *G01S 17/89* (2013.01); *G02B 27/4205* (2013.01); *G02B 27/4272* (2013.01); *H04N 5/2256* (2013.01)

(58) Field of Classification Search
CPC ............ H04N 13/0239; H04N 5/2256; H04N 13/0271; H04N 2013/0081; G02B 26/0808; G02B 27/30; G02B 27/425; G02B 27/48
See application file for complete search history.

(56) References Cited

U.S. PATENT DOCUMENTS 9,826,216 B1 * 11/2017 Hazeghi ............ G02B 27/0075
2016/0377414 A1 * 12/2016 Thuries ................. G01B 11/02
356/625

* cited by examiner

*Primary Examiner* — Luke D Ratcliffe
(74) *Attorney, Agent, or Firm* — Fenwick & West LLP

(57) ABSTRACT

A depth measurement assembly (DMA) measures depth information of an object in a local area. The DMA includes structured light projector, a depth camera assembly, and a controller. The structured light projector projects structured light patterns into the local area. The structured light projector includes a diffractive optical unit that includes diffractive optical elements (DOEs) and selects a DOE. The selected DOE is illuminated by light from a light source and converts the light into a structured light pattern. In some embodiment, the diffractive optical units selects multiple DOEs associated with multiple structured light patterns. The structured light pattern is projected into the local area by a projection assembly of the structured light projector and illuminates the object. The depth camera assembly captures images of the object. The controller uses the captured images to determine depth information of the object.

18 Claims, 6 Drawing Sheets

500

Select one or more diffractive optical elements (DOEs) associated with one or more structured light patterns
510

Project the one or more structured light patterns to illuminate an object in a local area
520

Capture one or more images of the object illuminated with the one or more structured light patterns
530

Determine depth information of the object based on the captured images
540

FIG. 5

DEPTH MEASUREMENT USING SCANNING DIFFRACTIVE OPTICAL ELEMENTS

BACKGROUND

The present disclosure generally relates to depth measurement, and specifically relates to using scanning diffractive optical elements for depth measurement in head-mounted display (HMD) applications.

Depth measurement is an important feature for HMD systems, such as systems used in virtual reality (VR) and augmented reality (AR) applications. Depth measurements systems typically include some sort of active illumination system that illuminates a local area (e.g., by projecting structured light, and light pulse, etc.). The depth measurement system then uses images of the local area that include the projected light in order to determine depth information of objects in the local area. Different types of structured light patterns or different fields of view are often required for objects with different shapes or at different locations in the local area. However, existing depth measurement systems have a drawback that a single depth measurement system only projects a single type of structured light pattern or has a single field of view. Accordingly, multiple depth measurement systems often have to be used to determine depth information of different objects, which impair effectiveness of depth measurement and also increases weight, cost, and system complexity of HMD systems.

SUMMARY

A depth measurement assembly (DMA) includes a plurality of diffractive optical elements (DOEs) that generate different structured light patterns. And one or more of the structured light patterns are projected into a local area. The DMA captures images of a portion of the local area that include structured light patterns that have been scattered/reflected by objects in the local area. The DMA determines depth information of the objects based on the captured images. In some embodiments, the DMA selects different DOEs for different objects (e.g., objects with different distances or positions) in the local area. For example, different DOEs are selected for detecting hand interaction, object scanning, and room scanning.

The DMA includes a structured light projector, a depth camera assembly, and a controller. The structured light projector includes a diffractive optical unit that includes the plurality of DOEs, a light source, and a projection assembly. The diffractive optical unit is configured to select one or more DOEs from the plurality of DOEs. The light source emits light and scans the selected DOEs. Each of the scanned DOEs generates a structured light pattern associated with the scanned DOE. The projection assembly projects the structured light patterns into the local area. In some embodiments, the structured light projector 310 also include one or more refractive lenses, temperature sensors, calibration EEPROMs, and encoders (e.g., one or more optical encoders or magnetic encoders) that determine positions of the DOEs. The depth camera assembly captures one or more images of the portion of the local area illuminated with the structured light pattern. The structured light projector and the depth camera assembly can be controlled by the controller. For example, the controller instructs the diffractive optical unit to select the DOEs and instruct the depth camera assembly to capture the images. Also, the controller determines depth information of one or more objects located in the portion of the local area based in part on the images captured by the depth camera assembly.

In some embodiments, the DMA is part of a HMD. The HMD system may operate in a VR system environment, an AR system environment, a mixed reality (MR) system environment, or some combination thereof. The HMD comprises an electronic display, an optics block, and the DMA. The electronic display displays a virtual object based in part on depth information determined by the DMA. The optics block directs light from the electronic display element to an eyebox of the HMD.

BRIEF DESCRIPTION OF THE DRAWINGS

FIG. 5 is a flowchart illustrating a process of determining depth information of an object in a local area, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

A diffractive optical unit is a part of a structured light projector configured to project a structured light pattern into a local area. The diffractive optical unit includes a plurality of DOEs. Each of the DOEs is associated with a structured light pattern, and at least two of the DOEs produce different structured light patterns. The diffractive optical unit selects a DOE and the structured light projector projects the structured light pattern of the selected DOE.

Figure 1:
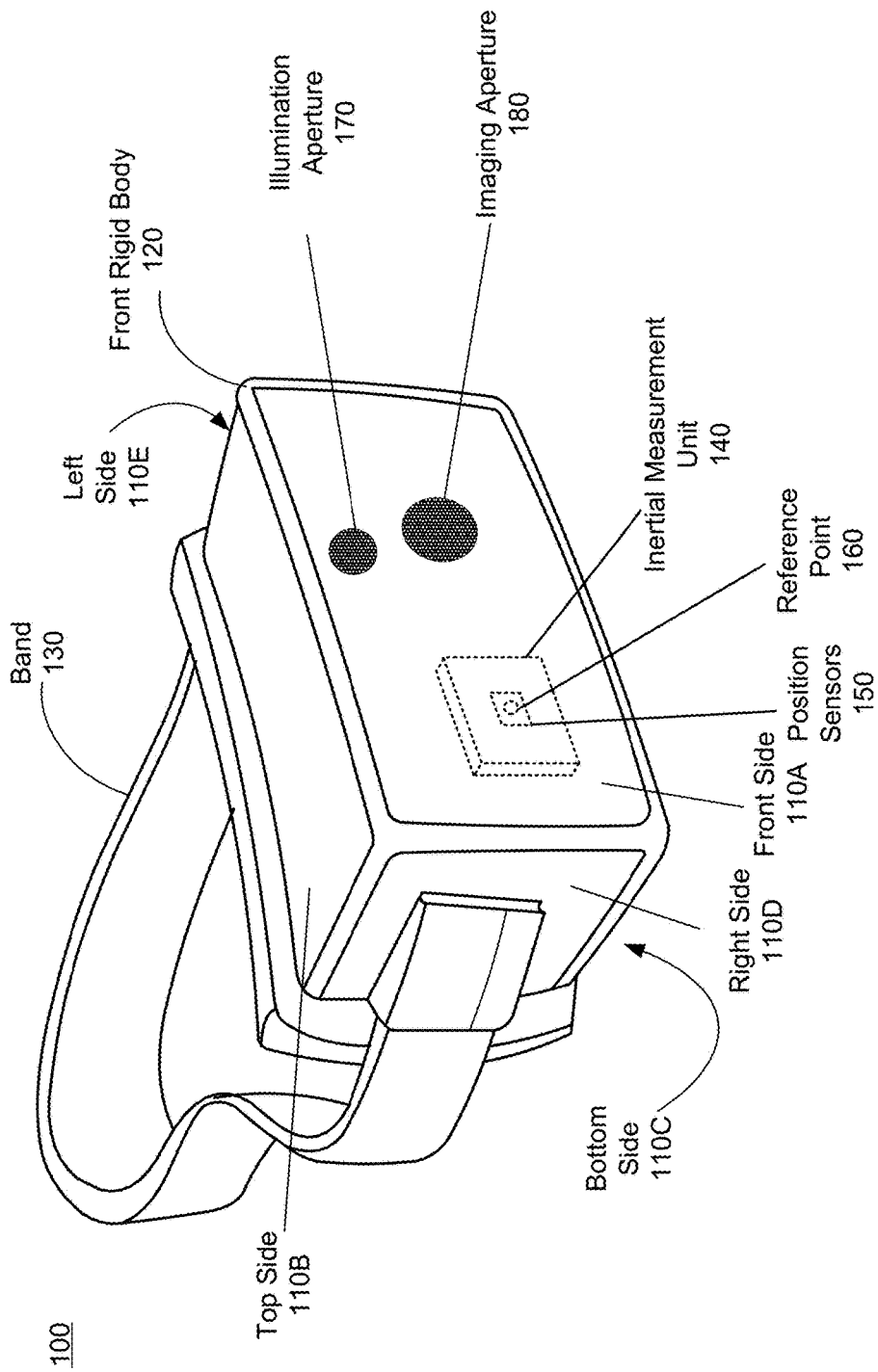
FIG. 1 is a wire diagram of a HMD, in accordance with an embodiment.

FIG. 1 is a wire diagram of a HMD 100, in accordance with an embodiment. The HMD 100 may be part of, e.g., a VR system, an AR system, a MR system, or some combination thereof. The HMD 100 includes a front side 110A, a top side 110B, a bottom side 110C, a right side 110D, a left side 110E, a front rigid body 120, and a band 130. In embodiments that describe AR system and/or a MR system, portions of the HMD 100 that are between the front side 110A of the HMD 100 and an eye of the user are at least partially transparent (e.g., a partially transparent electronic display). The front rigid body 120 includes an inertial measurement unit (IMU) 140, one or more position sensors 150, and a reference point 160.

The IMU 140 is an electronic device that generates IMU data based on measurement signals received from one or more of the position sensors 150. A position sensor 150 generates one or more measurement signals in response to motion of the HMD 100. Examples of position sensors 150 include: one or more accelerometers, one or more gyroscopes, one or more magnetometers, another suitable type of sensor that detects motion, a type of sensor used for error correction of the IMU 140, or some combination thereof. The position sensors 150 may be located external to the IMU 140, internal to the IMU 140, or some combination thereof. In the embodiment shown by FIG. 1, the position sensors 150 are located within the IMU 140, and neither the IMU 140 nor the position sensors 150 are visible to the user.

Based on the one or more measurement signals from one or more position sensors 150, the IMU 140 generates IMU data indicating an estimated position of the HMD 100 relative to an initial position of the HMD 100. For example, the position sensors 150 include multiple accelerometers to measure translational motion (forward/back, up/down, left/right) and multiple gyroscopes to measure rotational motion (e.g., pitch, yaw, or roll). In some embodiments, the IMU 140 rapidly samples the measurement signals and calculates the estimated position of the HMD 100 from the sampled data. For example, the IMU 140 integrates the measurement signals received from the accelerometers over time to estimate a velocity vector and integrates the velocity vector over time to determine an estimated position of a reference point on the HMD 100. The reference point 160 is a point that may be used to describe the position of the HMD 100. While the reference point may generally be defined as a point in space; however, in practice the reference point is defined as a point within the HMD 100 (e.g., a center of the IMU 140).

The HMD 100 also includes a DMA (not show in FIG. 1). Some embodiments of the DMA include a structured light projector and a depth camera assembly. The structured light projector projects structured light towards an object in a local area surrounding the HMD 100. The structured light projector includes a plurality of diffractive optical elements (DOEs), each of which is associated with a structured light pattern. The structured light projector can select a DOE and project the structured light pattern corresponding to the DOE. The depth camera assembly collects the structured light reflected from the object and captures images of the object. Based on the captured images, the DMA determines depth information of the object. The HMD 100 depicts an illumination aperture 170 and an imaging aperture 150. The structured light projector projects the structured light through the illumination aperture 170. And the depth camera assembly collects the structured light reflected from the object through the image aperture 150. More details about the DMA are described in conjunction with FIG. 3.

Figure 2:
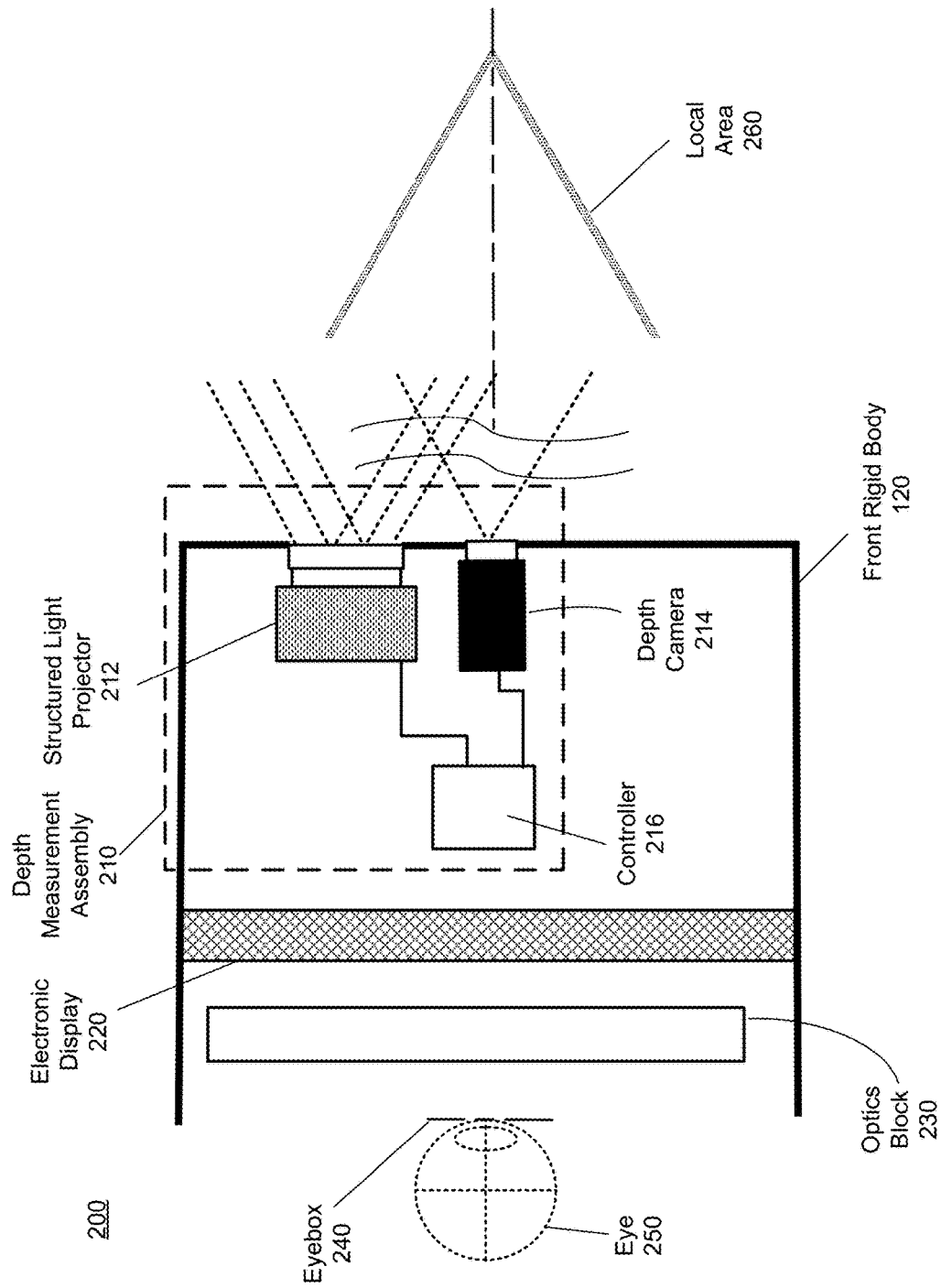
FIG. 2 is a cross section of a front rigid body of the HMD in FIG. 1, in accordance with an embodiment.

FIG. 2 is a cross section 200 of the front rigid body 120 of the HMD 100 in FIG. 1, in accordance with an embodiment. The front rigid body 120 includes a DMA 210, an electronic display 220, and an optics block 230. Some embodiments of the front rigid body 120 have different components than those described here. Similarly, in some cases, functions can be distributed among the components in a different manner than is described here. The front rigid body 120 also includes an eyebox 240 where an eye 250 of a user would be located. For purposes of illustration, FIG. 2 shows a cross section of the front rigid body 120 in accordance with a single eye 250. Although FIG. 2 depicts a center cross-section of the eye 250 as being in the same plane as the DMA 210, the center cross-section of the eye 250 and the DMA 210 do not have to be in the same plane. Additionally, another electronic display and optics block, separate from those shown in FIG. 2, may be included in the front rigid body 120 to present content, such as an augmented representation of a local area 260 or virtual content, to another eye of the user.

The DMA 210 includes a structured light projector 212, a depth camera assembly 214, and a controller 216. The structured light projector 212 illuminates the local area 260 with structured light. In some embodiments, the structured light projector 212 includes a light source, a diffractive optical unit, and a projection assembly. The light source emits light. The diffractive optical unit includes a plurality of DOEs. A DOE may be, e.g., one or more diffraction gratings, a diffuser, a spatial light modulator, some other element that forms structured light, or some combination thereof. Each DOE of the diffractive optical unit converts light from the light source into a structured light pattern. The structured light pattern may be, e.g., a dot matrix pattern, a line pattern, a sinusoid pattern, a multi (spatial) tone pattern, and a grid pattern, diffuse light (e.g., for time of flight or active stereo depth determination), some other light that can be used to determine depth information, or some combination thereof. In embodiments where the structured light pattern is diffuse light, the DOEs can be used to generate different field of views for the DMA 210. The DMA 210 selects the DOEs to adjust its field of view. More details about the diffractive optical unit are provided below in conjunction with FIGS. 3 and 4A-B. The projection assembly projects the structured light pattern into the local area 260. For example, the projection assembly includes one or more optical elements (e.g., lens, polarizer, etc.) that collect the structured light and project the structured light pattern into some or all of the local area 260.

The depth camera assembly 214 captures images of a portion the local area 260 and outputs the captured image to the controller 216. In some embodiments, the controller 216 is configured to determine depth information of objects in the local area 260 using the captured image from the depth camera 214. The controller 216 also controls how structured light is projected by the structured light projector 212 and how the depth camera assembly 214 captures image light. For example, the controller 216 instructs the diffractive optical unit of the structured light projector 212 to select one or more DOEs for illumination of the light source and instructs the depth camera assembly 214 to capture images. In alternate embodiments, some other device (e.g., a HMD console) determines depth information of objects in the local area 260. In some embodiments, the controller 360 provides the determined depth information to a console (not shown in FIG. 2) and/or an appropriate module of the HMD 100 (e.g., a varifocal module, not shown in FIG. 2). The console and/or the HMD 100 may utilize the depth information to, e.g., generate content for presentation on the electronic display 220.

The electronic display 220 displays images (e.g., 2D or 3D images) to the user. In various embodiments, the electronic display 220 comprises a single electronic display panel or multiple electronic display panels (e.g., a display for each eye of a user). Examples of an electronic display panel include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optics block 230 magnifies received light from the electronic display 220 and may also correct optical errors associated with the image light. The corrected image light is presented to a user of the HMD 100. The optics block 230 is an optical element, such as an aperture, a Fresnel lens, a convex lens, a concave lens, a filter, or any other suitable optical element that affects the image light from the electronic display 220. Moreover, the optics block 230 may include combinations of different optical elements. In some embodiments, one or more of the optical elements in the optics block 230 may have one or more coatings, such as partial reflectors or anti-reflective coatings.

Magnification of the image light by the optics block 230 allows the electronic display 220 to be physically smaller, weigh less, and consume less power than larger displays. Additionally, magnification may increase a field of view of the displayed media. For example, the field of view of the displayed media is such that the displayed media is presented using almost all (e.g., 110° diagonal), and in some cases all, of the user's instantaneous field of view. In some embodiments, the effective focal length the optics block 230 is larger than the spacing to the electronic display 220. Consequently, the optics block 230 magnifies the image light projected by the electronic display 220. Additionally, in some embodiments, the amount of magnification may be adjusted by adding or removing optical elements.

The optics block 230 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 220 for display is pre-distorted, and the optics block 230 corrects the distortion when it receives image light from the electronic display 220 generated based on the content.

In some embodiments, the front rigid body 120 further comprises an eye tracking system (not shown in FIG. 2) that determines eye tracking information for the user's eye 250. The determined eye tracking information may comprise information about an orientation of the user's eye 250 in an eye-box, i.e., information about an angle of an eye-gaze. An eye-box represents a three-dimensional volume at an output of a HMD in which the user's eye is located to receive image light. In one embodiment, the user's eye 250 is illuminated with structured light. Then, the eye tracking system can use locations of the reflected structured light in a captured image to determine eye position and eye-gaze. In another embodiment, the eye tracking system determines eye position and eye-gaze based on magnitudes of image light captured over a plurality of time instants.

In some embodiments, the front rigid body 120 further comprises a varifocal module (not shown in FIG. 2). The varifocal module may adjust focus of one or more images displayed on the electronic display 220, based on the eye tracking information. In one embodiment, the varifocal module adjusts focus of the displayed images and mitigates vergence-accommodation conflict by adjusting a focal distance of the optical block 230 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 216 to generate content for presentation on the electronic display 220.

Figure 3:
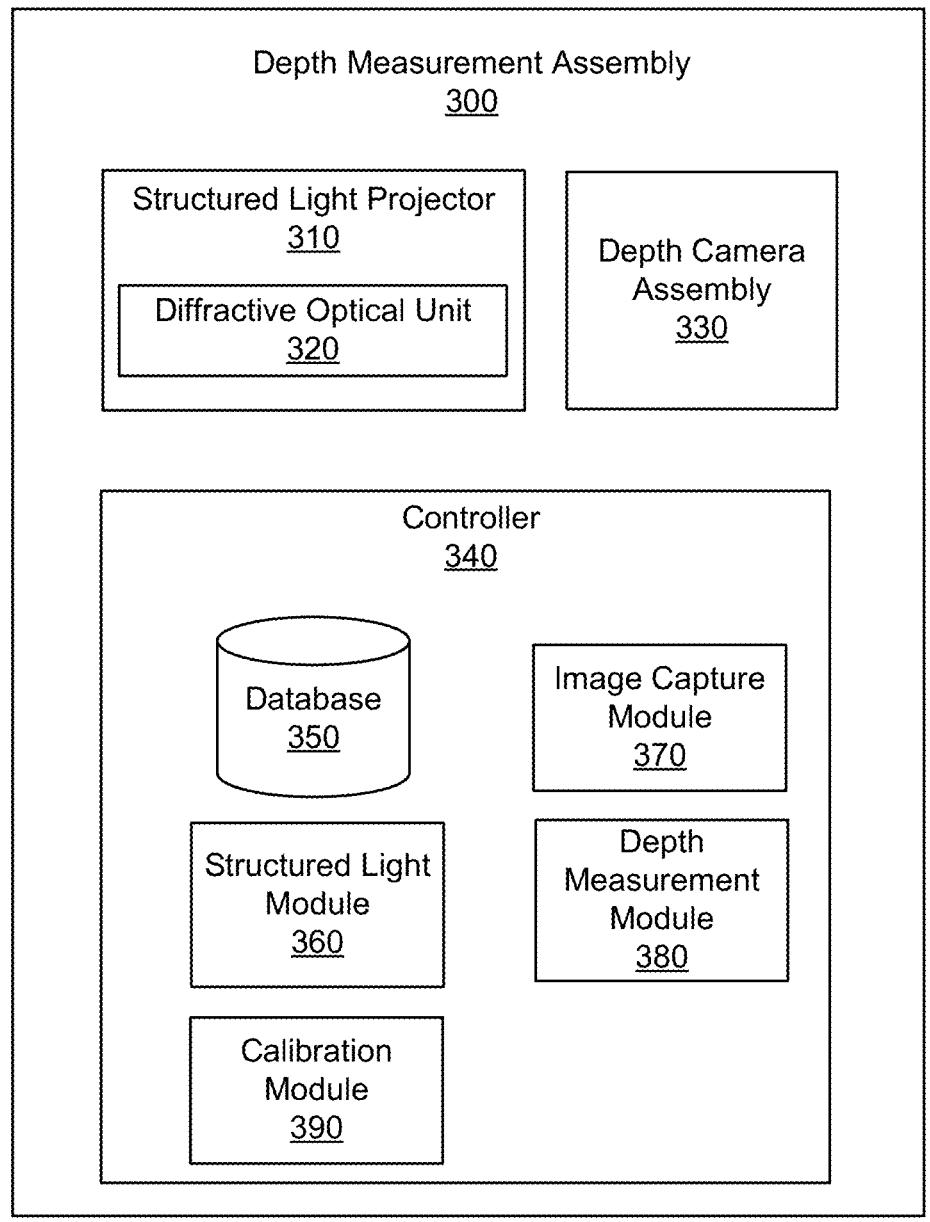
FIG. 3 is a block diagram of a DMA, in accordance with an embodiment.

FIG. 3 is a block diagram of a DMA 300, in accordance with an embodiment. The DMA 300 determines depth information of one or more objects in a local area, e.g., a local area surrounding a HMD. An embodiment of the DMA 300 is the DMA 210 described in conjunction with FIG. 2. The DMA 300 includes a structured light projector 310, a depth camera assembly 330, and a controller 340. Some embodiments of the DMA 300 have different components than those described here. Similarly, the functions can be distributed among the components in a different manner than is described here.

The structured light projector 310 projects structured light patterns into the local area. In some embodiments, the structured light projector 310 includes a light source (not shown in FIG. 3), a diffractive optical unit 320, and a projection assembly (not shown in FIG. 3). The light source emits light. For example, the light source can emit light in the visible band (i.e., ~380 nm to 750 nm), in the infrared (IR) band (i.e., ~750 nm to 10 μm), in the ultraviolet band (i.e., 10 nm to 380 nm), some other portion of the electromagnetic spectrum, or some combination thereof. In some embodiments, the light source includes a light emitting diode (LED), an incandescent bulb, a fluorescent bulb, a high-intensity discharge bulb, or any combination thereof.

The diffractive optical unit 320 converts light emitted from the light source into structured light. Structured light is light that may be used to determine depth information. The diffractive optical unit 320 includes a plurality of DOEs. A DOE generates a structured light pattern from the emitted light. A DOE may be, e.g., one or more diffraction gratings, a diffuser, a spatial light modulator, some element that forms structured light, or some combination thereof. In one embodiment, each of the DOEs is associated with a different structured light pattern. Alternatively, some of the DOEs may be associated with a same structured light pattern. Structured light patterns may include, e.g., dot pattern, line pattern, sinusoid pattern, grid pattern, multi-tone pattern, diffuse light (e.g., for time of flight operation), other types of structured light patterns, or some combination thereof.

In one embodiment, the DOEs are associated with structured light patterns for different angular field of view occupying different regions of space. For example, a first DOE is associated with a dot pattern for a first angular field of view occupying a region of space beyond a first threshold distance from the structured light projector 310, and a second DOE is associated with a line pattern for a second angular field of view occupying a region of space within a second threshold distance from the structured light projector 310. The two DOEs can be used for determining depth information of different objects at different locations in the local area. For example, the first DOE can be used for determining depth information of an object that is located in the first angular field of view, i.e., further from the DMA 300, while the second DOE can be used for measuring depth information of an object that is located in the second angular field of view, i.e., closer to the DMA 300. Similarly, the two DOEs can be used for determining depth information of different parts of one object in the local area, e.g., the first DOE for a part of the object that is further to the DMA 300 and the second DOE for another part of the object that is closer to the DMA 300.

In another embodiment, the DOEs are associated with structured light patterns for determining depth information of objects having different shapes. For example, one or more of the DOEs are associated with a dot pattern for determining depth information of objects having a substantially curved surface, and one or more of the DOEs are associated with a line pattern for determining depth information of objects having different shapes with a substantially flat surface. In some embodiments, parallel lines are used for determining depth information for regions close to a user (e.g., for hand tracking), and dot patterns are used for determining depth information for regions farther from the user (e.g., more than 6 feet).

The diffractive optical unit 320 selects one or more of the DOEs in accordance with depth instructions. In some embodiments, the DOEs are in an ordered sequence. The diffractive optical unit 320 can select each of the DOEs in accordance with the ordered sequence. For example, the diffractive optical unit 320 includes a plate, on which the DOEs are mounted. The plate can continuously spin at a speed during a depth measurement process, so that the light from the light source "scans" all or some of the DOEs at the speed. The speed may be predetermined or specified in depth instructions received from the controller 340. In some embodiments, the speed can be determined based on a frame rate of the depth camera assembly 330 and a number of DOEs in the diffractive optical unit 320. For example, the frame rate of the depth camera assembly 330 is 240 frame per second (fps) and the diffractive optical unit 320 includes four DOEs, the speed equals 240 fps divided by 4, which is 60 fps. In some embodiments, instead of specifying a speed, the depth instructions provide a scanning interval for each selected DOE. The scanning interval for a selected DOE is a time interval during which light from the light source scans the DOE, i.e., a time interval during which the DOE generates its corresponding structured light pattern. Scanning intervals for all the selected DOEs may have a same length (e.g., 1 second). Or scanning intervals for some selected DOEs have different lengths. The depth instructions may also specify a start DOE and an end DOE. The diffractive optical unit 320 spins from the start DOE to the end DOE.

In some alternative embodiments, the diffractive optical unit 320 selects one or more DOEs in a discrete manner. For example, the depth instructions specifies one or more DOEs. The specified DOEs are not necessarily neighboring on the plate of the diffractive optical unit 320. The diffractive optical unit 320 spins to a location corresponding to each of the specified DOEs to select the DOE.

In one embodiment, the diffractive optical unit 320 includes one DOE that is mounted on a mounting element. The mounting element has a plurality of adjustable positions. As the position of the mount element is adjusted, the position of the DOE is adjusted. The DOE generates a different structured light pattern at each position. The diffractive optical unit 320 selects positions of the mounting element.

The projection assembly projects the structured light into the local area. The projection assembly includes one or more optical elements (e.g., lens, polarizer, etc.) that collect the structured light and project the structured light into some or all of the local area. Accordingly, the local area (including the objects in the local area) is illuminated by a structured light pattern associated with a DOE selected by the diffractive optical unit 320. The shape of an object distorts the structured light pattern. Reflected structured light from the object illustrates the distortion and therefore, can be used to obtain depth information of the object.

In some embodiments, the structured light projector 310 also include one or more refractive lenses, temperature sensors, and calibration EEPROMs. The structured light projector 310 can further include an encoder (e.g., an optical encoder or magnetic encoder) that determines positions of the DOEs of the diffractive optical unit 320. The diffractive optical unit 320 can use the encoders to select DOEs.

The depth camera assembly 330 captures one or more image of a portion of the local area illuminated with the structured light in accordance with depth instructions. In some embodiments, the depth camera assembly 330 is co-located with the structured light projector 310 (e.g., may be part of the same device). In some embodiments, the depth camera assembly 330 includes a detector that detects structured light pattern in a field of view of the depth camera assembly 330. The detector comprises an arrays of photodiodes. A photodiode is sensitive to light and converts collected photons to digital signals. In one embodiment, each of the photodiodes has one or more memory units that store the digital signals. The depth camera assembly 330 reads out the stored digital signals from the one or more memory units of each photodiode to generate the images.

In some embodiments, the detector of the depth camera assembly 330 is synchronized with the diffractive optical unit 320. For example, the detector takes exposures of the portion of the local area during a scanning interval of a DOE is selected by the diffractive optical unit 320. In some embodiments, when no DOE is selected (i.e., no structured light projected into the local area), the detector does not take exposures. In some embodiments, during a scanning interval for each selected DOE, the detector takes one or more exposures for a time period ("exposure duration") that is at least equal to the time interval. Alternatively, the exposure duration can be slightly longer than the scanning interval to accommodate delay in incoming light due to distance between the structured light projector 310, the object, and the depth camera assembly 330. For example, for each scanning interval, the detector starts to collect light a predetermined period of time (e.g., 10% of the scanning interval) before the scanning interval starts and stops collecting light a predetermined period of time (e.g., 10% of the scanning interval) after the scanning interval end.

In some other embodiment, the detector continuously takes exposure during a duration of time that the diffractive optical unit is active. During the duration of time, the diffractive optical unit can select multiple DOEs. Accordingly, the captured images can include multiple structured light patterns corresponding to the DOEs.

The controller 340 controls the structured light projector 310 and the depth camera assembly 330. The controller 340 also determines depth information using images captured by the depth camera assembly 330. The controller 340 can also generate tracking information based on the depth information. Tracking information is information indicating positions, orientations and/or movement of objects and/or HMD orientation. Tracking information includes, e.g., depth information of a local area, movement information of an object, position and orientation of one or both eyes of a user, gaze direction (e.g., where a user is looking), vergence, estimated accommodation plane, etc.

In the example shown by FIG. 3, the controller 340 includes a database 350, a structured light module 360, an image capture module 370, a depth measurement module 380, and a calibration module 390. These modules are software modules implemented on one or more processors, dedicated hardware units, or some combination thereof. Some embodiments of the controller 340 have different components than those described in conjunction with FIG. 3. Similarly, functions of the components described in conjunction with FIG. 3 may be distributed among other components in a different manner than described in conjunction with FIG. 3. For example, some or all of the functionality described as performed by the controller 340 may be performed by a HMD console.

The database 350 stores data generated and/or used by the DMA 300. The database 350 is a memory, such as a ROM, DRAM, SRAM, or some combination thereof. The database 350 may be part of a larger digital memory of a HMD system. In some embodiments, the database 350 stores images captured by the depth camera assembly 330, baseline data from the calibration module 390 describing trained or established baseline prior to depth measurement, depth information, and analysis data from the depth measurement module 380 describing characterization parameters. In some embodiments, the database 350 may store calibration data and/or other data from other components, such as depth instructions. Depth instructions include structured light instructions generated by the structured light module 360 and image instructions generated by the image capture module 370.

The database 350 also stores a model for an object of which the depth camera assembly 330 captures images. The model is used to compare to the image captured by the depth camera to determine depth and tracking information of the object. The model stored in the database 350 can be a three-dimensional model which approximates the surface geometry of the object. In embodiments in which the depth camera assembly 330 captures image data of more than one object, the database 350 may contain more than one model.

The structured light module 360 controls the structured light projector 310 via structured light instructions. The structured light instructions include one or more illuminator parameters that control how light is emitted by the structured light projector 310. The illuminator parameters may include light intensity, illumination duration, light color, illuminator direction, or any combination thereof. Also, the structured light instructions include one or more scanning parameters that control how the diffractive optical unit 320 selects DOEs. For example, the scanning parameters specify which DOE(s) to select and a scanning interval for each selected DOE. In embodiments where the diffractive optical unit 320 is a spinning plate, the scanning parameters include a spinning speed and a number of spinning cycles. The structured light module 360 may retrieve the structured light instructions from the database 350.

Alternatively, the structured light module 360 generates the structured light instructions. For example, the structured light module 360 determines one or more structured light patterns projected by the structured light projector 310 and selects one or more DOEs based on the one or more structured light patterns. The one or more structured light patterns may be determined based on location, shape, size, or other types of characteristics of an object, whose depth information the controller 340 is to measure. In some embodiments, the structured light module 360 selects the one or more structured light patterns based on the previously reported depth information of an object as reported by the DMA 300. Structured light patterns determined by the structured light module 360 may include, e.g., dot pattern, line pattern, sinusoid pattern, grid pattern, multi-tone pattern, diffuse light (e.g., for time of flight operation), other types of structured light patterns, or some combination thereof.

The image capture module 370 controls the depth camera assembly 330 via image instructions. The image capture module 370 may retrieve image instructions from the database 350. Alternatively, the image capture module 370 generates image instructions based in part on the structured light instructions generated by the structured light module 360. In one embodiment, the image capture module 370 determines exposure duration of the depth camera assembly 330, e.g., based on a scanning interval for a selected DOE specified in the structured light instructions. For example, the image capture module 370 determines that the exposure duration equals the scanning interval. Sometimes the image capture module 370 determines that the exposure duration is longer than the scanning interval to avoid failure to collect structured light reflected from the object due to delay in incoming light. The exposure duration can be 20% longer than the scanning interval. In some embodiments, the image capture module 370 also determines a number of exposures for each exposure duration.

The depth measurement module 380 is configured to determine depth information for the one or more objects based at least in part on the captured portions of the reflected structured light. In some embodiments, the depth measurement module 380 is configured to determine depth information based on phase-shifted patterns of the portions of the reflected structured light distorted by shapes of the objects in the local area, and to use triangulation calculation to obtain a depth map of the local area. In some embodiments, the depth measurement module 380 provides the determined depth information to an HMD system. The HMD system may utilize the depth information to, e.g., generate content for presentation on an electronic display 220.

Figure 4B:
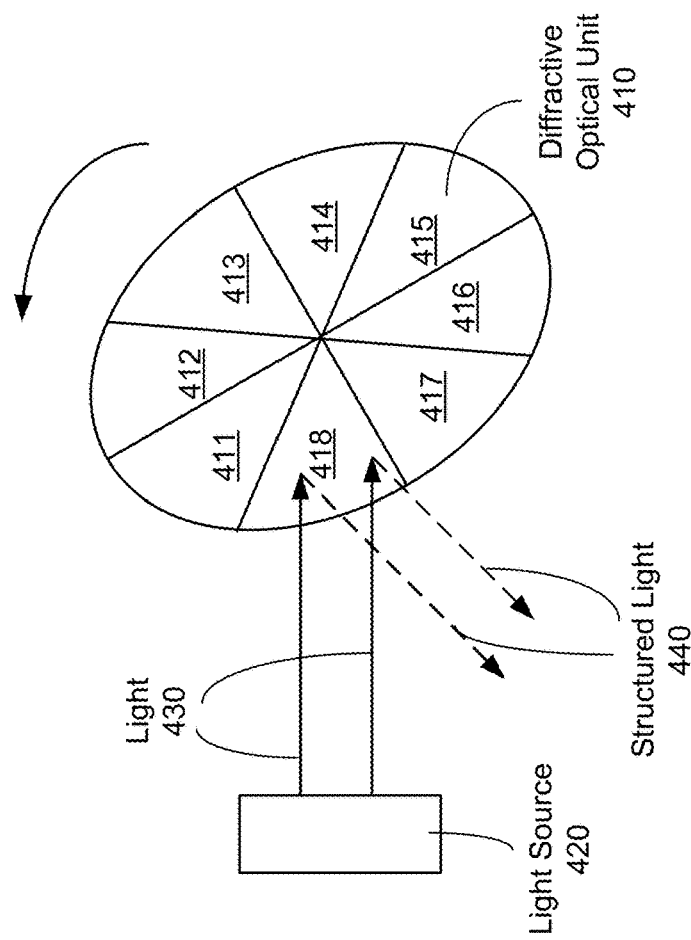
FIG. 4B illustrates the diffractive optical unit scanned by a light source, in accordance with an embodiment.
Figure 4A:
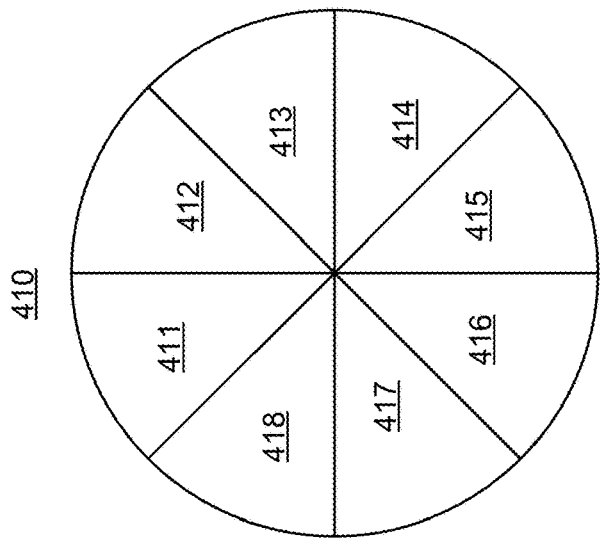
FIG. 4A illustrates a diffractive optical unit of the DMA, in accordance with an embodiment.

FIG. 4A illustrates a diffractive optical unit 410 of the DMA 300, in accordance with an embodiment. The diffractive optical unit 410 is a circular plate. Eight DOEs 411-418 are mounted on the plate. As shown in FIG. 4A, each of the DOEs 411-418 has a same size on the plate. In other embodiments, some DOEs can have different sizes and there can be a different number of DOEs mounted on the plate. Also, the diffractive optical unit 410 can have a different shape, e.g., polygon.

FIG. 4B illustrates the diffractive optical unit 410 scanned by a light source 420, in accordance with an embodiment. In the embodiment of FIG. 4B, the light source 420 is fixed relative to the diffractive optical unit 410. The light source 420 projects light 430 onto the diffractive optical unit 410. One of the DOEs 411-418 faces the light source and converts the light 430 into structured light 440. The diffractive optical unit 410 can spin. While the diffractive optical unit 410 spins, the light 430 scans through the DOEs 411-418 on the diffractive optical unit 410. Even though FIG. 4B shows that the diffractive optical unit 410 spins anticlockwise, the diffractive optical unit 410 may also spin clockwise.

Each of the DOEs 411-418 converts the light 430 into a corresponding structured light pattern. For example, the DOE 411 converts the light into a dot pattern, while the DOE 412 converts the light into a line pattern. The DOEs 411-418 can be associated with different structured light patterns. Alternatively, some of them can be associated with a same structured light pattern. For example, the DOEs 412 and 416 can both be associated with a line pattern.

In the embodiment of FIG. 4B, the DOEs 411-418 are in an ordered sequence, i.e., in a clockwise sequence from 411 to 418. In some embodiments, the diffractive optical unit 410 continuously spins to select each of the DOEs 411-418 in accordance with the ordered sequence. For example, the diffractive optical unit 410 starts with the DOE 418, then the diffractive optical unit 410 rotates anticlockwise to select the DOE 411. The diffractive optical unit 410 can spin at a predetermined speed, so that the light source 420 scans the DOEs 411-418 at the predetermined speed and structured light patterns are continuously generated. This process may stop when the diffractive optical unit 410 has selected each of the DOEs 411-418 once. Alternatively, the diffractive optical unit 410 can spin for multiple cycles so that each DOE is selected multiple times.

In some alternative embodiments, the diffractive optical unit 410 selects DOEs in a discrete manner. For example, the diffractive optical unit 410 receives a depth instruction to select the DOE 415. In response to the depth instruction, the diffractive optical unit 410 spins until the DOE 415 is facing the light source. The diffractive optical unit 410 can be instructed to select another DOE, e.g., the DOE 418 subsequently. The diffractive optical unit 410 then spins till the DOE 418 faces the light source 420. The diffractive optical unit 410 may spin clockwise or anticlockwise to select the DOE 418 with minimum spin. The diffractive optical unit 410 may select DOEs by using positions of the DOEs determined by one or more encoders.

FIG. 5 is a flowchart illustrating a process 500 of determining depth information of an object in a local area, in accordance with an embodiment. The process 500 is performed by the DMA 300 described in conjunction with FIG. 3. Alternatively, other components of a HMD system may perform some or all of the steps of the process 500. For example, in some embodiments, a HMD and/or a console may perform some of the steps of the process 500. Additionally, the process 500 may include different or additional steps than those described in conjunction with FIG. 5 in some embodiments or perform steps in different orders than the order described in conjunction with FIG. 5.

The DMA 300 selects 510 one or more diffractive optical elements (DOEs) associated with one or more structured light patterns. The selection, in some embodiment, is in accordance with depth instructions. The DMA 300 may select one DOE. Or the DMA 300 may select a plurality of DOEs in an ordered sequence in accordance with their ordered sequence. A DOE converts light into a structured light pattern. In one embodiment, each of the DOEs is associated with a different structured light pattern. Different structured light patterns can be used for depth measurement of different objects in a local area or different parts of one object. For example, a dot pattern can be used for depth measure of an object located far from the DMA 300, and a line pattern is used for depth measurement of an object located close to the DMA 300. In another embodiment, some of the DOEs are associated with a same structured light pattern.

The DMA 300 projects 520 (e.g., via the structured light projector 310) the one or more structured light patterns to illuminate an object in a local area. The shape of the object distorts the one or more structured light patterns. And the DMA 300 (e.g., the depth camera assembly 330) captures 530 one or more images of the object illuminated with the one or more structured light patterns. The DMA 300 collects the structured light reflected from the object to generate the one or more images. Accordingly, the captured images show the distortion in the one or more structured light patterns due to the shape of the object.

The DMA 300 determines 540 depth information of the object based on the captured images. For example, the DMA 300 analyzes distortion in the one or more structured light pattern due to the shape of the object. A model of the object stored in a database associated with the depth measurement unit 100 may be used for the analysis. The DMA 300 compares the model of the object with the captured images to analyze the distortions. The DMA 300 further determines the depth information of the object based on the distortion.

Figure 6:
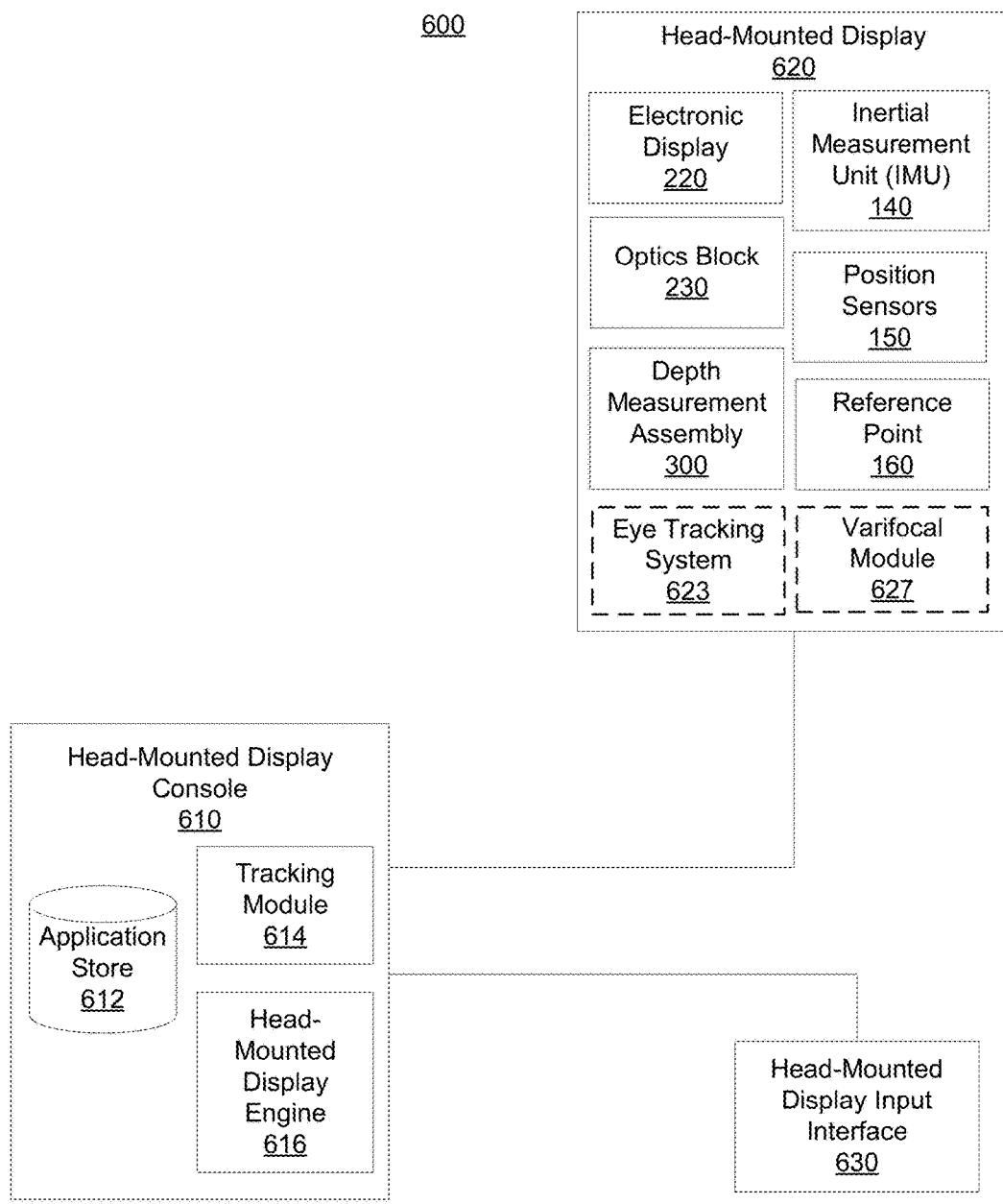
FIG. 6 is a block diagram of a HMD system in which the DMA operates, in accordance with an embodiment.

FIG. 6 is a block diagram of a HMD system 600 in which the DMA 300 operates, in accordance with an embodiment. The HMD system 600 may operate in a VR system environment, an AR system environment, an MR system environment, or some combination thereof. The HMD system 600 shown by FIG. 6 comprises a HMD console 610 coupled to a HMD 620 and a HMD input interface 630. While FIG. 6 shows an example system 600 including one HMD 620 and one HMD input interface 630, in other embodiments any number of these components may be included in the system 600. For example, there may be multiple HMDs 620, each having an associated HMD input interface 630 and communicating with the HMD console 610. In alternative configurations, different and/or additional components may be included in the HMD system 600. Similarly, functionality of one or more of the components can be distributed among the components in a different manner than is described here. For example, some or all of the functionality of the HMD console 610 may be contained within the HMD 620.

The HMD 620 is a head-mounted display that presents content to a user comprising virtual and/or augmented views of a physical, real-world environment with computer-generated elements (e.g., 2D or 3D images, 2D or 3D video, sound, etc.). Examples of media presented by the HMD 620 include one or more images, video, audio, or some combination thereof. In some embodiments, audio is presented via an external device (e.g., speakers and/or headphones) that receives audio information from the HMD 620, the HMD console 610, or both, and presents audio data based on the audio information.

An embodiment of the HMD 620 is the HMD 100 described in conjunction with FIG. 1. The HMD 620 includes an electronic display 220, an optics block 230, an IMU 140, one or more position sensors 150, a reference point 160, the DMA 300, an optional eye tracking system 623, and an optional varifocal module 627. Some embodiments of the HMD 620 have different components than those described here.

In some embodiments, the IMU 140 receives one or more calibration parameters, e.g., from the HMD console 610. The one or more calibration parameters are used to maintain tracking of the HMD 620. Based on a received calibration parameter, the IMU 140 may adjust one or more IMU parameters (e.g., sample rate). In some embodiments, certain calibration parameters cause the IMU 140 to update an initial position of the reference point 160 so it corresponds to a next calibrated position of the reference point 160. Updating the initial position of the reference point 160 as the next calibrated position of the reference point 160 helps reduce accumulated error associated with the determined estimated position. The accumulated error, also referred to as drift error, causes the estimated position of the reference point 160 to "drift" away from the actual position of the reference point 160 over time.

The DMA 300 determines depth information of objects in a local area surrounding the HMD 620. For example, the DMA 300 includes a structured light projector 310 that illuminates the objects with structured light patterns. The structured light projector 310 includes a plurality of DOEs. Each DOE can be illuminated by a light source of the structured light projector and generates a structured light pattern. The plurality of DOEs correspond to multiple different structured light patterns. The DMA 300 can select a DOE, e.g., based on location, shape, or other types of characteristics of an object whose depth information is to be determined. Also, the DMA 300 can select a sequence of DOEs for illuminating the object with a sequence of structured light patterns. The structured light patterns are distorted by the object. A depth camera assembly 330 of the DMA collects light reflected from the object and captures images of the object. A controller 340 of the DMA determines depth information of the object based on the captured images. For example, the controller 340 compares the captured images with a model of the object. The controller can also control the structured light projector and depth camera assembly. In some other embodiments, the functions of the DMA 300 described FIG. 1 may be distributed among other components in the HMD system 600 in different manners in other embodiments. For example, some or all of the functionality provided by the controller 340 may be performed by the HMD console 610. Alternatively, some of the control and processing modules of the DMA 300 are part of the HMD 620, and others are part of the HMD console 610.

In some embodiments, the eye tracking system 623 is integrated into the HMD 620. The eye tracking system 623 determines eye tracking information associated with an eye of a user wearing the HMD 620. The eye tracking information determined by the eye tracking system 623 may comprise information about an orientation of the user's eye, i.e., information about an angle of an eye-gaze. In some embodiments, the eye tracking system 623 is integrated into the optical block 230. An embodiment of the eye-tracking system 623 may comprise an illumination source and an imaging device (camera). In some embodiments, the eye tracking system 623 informs the controller 340 of the depth measurement assembly 300 of an object of interest position. For example, the eye tracking system 623 determines a gaze direction of the eye of the user and identifies the object of interested based on the gaze direction. After being informed, the controller 340 can select one or more DOEs to determine depth information of the object of interest.

In some embodiments, the varifocal module 627 is further integrated into the HMD 620. The varifocal module 627 may be coupled to the eye tracking system 623 to obtain eye tracking information determined by the eye tracking system 623. The varifocal module 627 may be configured to adjust focus of one or more images displayed on the electronic display 220, based on the determined eye tracking information obtained from the eye tracking system 623. In this way, the varifocal module 627 can mitigate vergence-accommodation conflict in relation to image light. The varifocal module 627 can be interfaced (e.g., either mechanically or electrically) with at least one of the electronic display 220 and at least one optical element of the optical block 230. Then, the varifocal module 627 may be configured to adjust focus of the one or more images displayed on the electronic display 220 by adjusting position of at least one of the electronic display 220 and the at least one optical element of the optical block 230, based on the determined eye tracking information obtained from the eye tracking system 623. By adjusting the position, the varifocal module 627 varies focus of image light output from the electronic display 220 towards the user's eye. The varifocal module 627 may be also configured to adjust resolution of the images displayed on the electronic display 220 by performing foveated rendering of the displayed images, based at least in part on the determined eye tracking information obtained from the eye tracking system 623. In this case, the varifocal module 627 provides appropriate image signals to the electronic display 220. The varifocal module 627 provides image signals with a maximum pixel density for the electronic display 220 only in a foveal region of the user's eye-gaze, while providing image signals with lower pixel densities in other regions of the electronic display 220. In one embodiment, the varifocal module 627 may utilize the depth information obtained by the DMA 300 to, e.g., generate content for presentation on the electronic display 220.

The HMD input interface 630 is a device that allows a user to send action requests to the HMD console 610. An action request is a request to perform a particular action. For example, an action request may be to start or end an application or to perform a particular action within the application. The HMD input interface 630 may include one or more input devices. Example input devices include: a keyboard, a mouse, a game controller, or any other suitable device for receiving action requests and communicating the received action requests to the HMD console 610. An action request received by the HMD input interface 630 is communicated to the HMD console 610, which performs an action corresponding to the action request. In some embodiments, the HMD input interface 630 may provide haptic feedback to the user in accordance with instructions received from the HMD console 610. For example, haptic feedback is provided when an action request is received, or the HMD console 610 communicates instructions to the HMD input interface 630 causing the HMD input interface 630 to generate haptic feedback when the HMD console 610 performs an action.

The HMD console 610 provides media to the HMD 620 for presentation to the user in accordance with information received from the HMD 620 and/or the HMD input interface 630. In the example shown in FIG. 6, the HMD console 610 includes an application store 612, a tracking module 614, and a HMD engine 616. Some embodiments of the HMD console 610 have different modules than those described in conjunction with FIG. 6. Similarly, the functions further described below may be distributed among components of the HMD console 610 in a different manner than is described here.

The application store 612 stores one or more applications for execution by the HMD console 610. An application is a group of instructions, that when executed by a processor, generates content for presentation to the user. Content generated by an application may be in response to inputs received from the user via movement of the HMD 620 or the HMD input interface 630. Examples of applications include: gaming applications, conferencing applications, video playback application, or other suitable applications.

The tracking module 614 calibrates the HMD system 600 using one or more calibration parameters and may adjust one or more calibration parameters to reduce error in determination of the position of the HMD 620. Moreover, calibration performed by the tracking module 614 also accounts for information received from the IMU 140. Additionally, if tracking of the HMD 620 is lost, the tracking module 614 re-calibrates some or all of the HMD system 700.

The tracking module 614 tracks movements of the HMD 620. The tracking module 614 determines positions of a reference point of the HMD 620 using position information from fast calibration information. Additionally, in some embodiments, the tracking module 614 may use portions of the fast calibration information to predict a future location of the HMD 620. Alternatively, the tracking module 614 may use depth information generated by the DMA 300 to track movements of the HMD 620. For example, the DMA 300 generates depth information of an object that is still as to the local area surrounding the HMD 620. Using the depth information, the tracing module 614 can determine movements of the object relative to the HMD 620, which is opposite to movements of the HMD 620 in the local area.

The tracking module 614 provides the estimated or predicted future position of the HMD 620 to the HMD engine 616.

The HMD engine 616 executes applications within the system environment 100 and receives depth information, position information, acceleration information, velocity information, predicted future positions, or some combination thereof of the HMD 620 from the tracking module 614. Based on the received information, the HMD engine 616 determines content to provide to the HMD 620 for presentation to the user. For example, if the received depth information indicates that an object has moved further from the HMD 620, the HMD engine 616 generates content for the HMD 620 that mirrors the object's movement in an augmented reality environment. Additionally, the HMD engine 616 performs an action within an application executing on the HMD console 610 in response to an action request received from the HMD input interface 630 and provides feedback to the user that the action was performed. The provided feedback may be visual or audible feedback via the HMD 620 or haptic feedback via the HMD input interface 630.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth measurement assembly (DMA) comprising:
a structured light projector configured to project a structured light pattern into a local area in accordance with depth instructions, wherein the structured light projector comprises:
a diffractive optical unit, the diffractive optical unit including a plurality of diffractive optical elements (DOEs), and each of the plurality of DOEs are associated with a corresponding structured light pattern, and the diffractive optical unit selects a DOE of the plurality of DOEs,
a light source that illuminates the selected DOE, the illuminated DOE generating a first structured light pattern, and
a projection assembly that projects the first structured light pattern into the local area,
wherein the plurality of DOEs are associated with a first pattern for an angular field of view occupying a region of space beyond a first overall threshold distance from the structured light projector and a second pattern for an angular field of view occupying a region of space within a second overall threshold distance from the structured light projector, and the second pattern is different from the first pattern; and
a depth camera assembly configured to capture one or more images of a portion of the local area illuminated with the first structured light pattern in accordance with depth instructions; and
a controller configured to:
generate the depth instructions;
provide the depth instructions to the structured light projector and the depth camera assembly, and
determine depth information of an object in the local area based in part on the one or more captures images.

2. The DMA of claim 1, wherein the diffractive optical unit comprises a plate configured to spin in accordance with the depth instructions, and the plurality of DOEs are mounted on the plate.

3. The DMA of claim 2, wherein the plate is configured to continuously spin at a speed specified in accordance with the depth instructions.

4. The DMA of claim 1, wherein the diffractive optical unit selects a DOE of the plurality of DOEs for illumination by the light source in accordance with the depth instructions.

5. The DMA of claim 1, wherein the plurality of DOEs are in an ordered sequence, and the diffractive optical unit selects each of the plurality of DOEs in accordance with the ordered sequence.

6. The DMA of claim 1, wherein each of the DOEs is associated with a different structured light pattern.

7. The DMA of claim 1, wherein some of the DOEs are associated with a same structured light pattern.

8. The DMA of claim 1, wherein the first pattern is a dot pattern and the second pattern is a line pattern.

9. The DMA of claim 1, wherein the structured light pattern corresponding to a DOE is selected from a list including: dot pattern, line pattern, sinusoid pattern, grid pattern, multi-tone pattern, diffuse light, other types of structured light patterns, or some combination thereof.

10. A structured light projector comprising:
- a diffractive optical unit, the diffractive optical unit including a plurality of diffractive optical elements (DOEs), and each of the plurality of DOEs are associated with a corresponding structured light pattern, and the diffractive optical unit selects a DOE of the plurality of DOEs in accordance with depth instructions from a controller of a depth measurement assembly, wherein the plurality of DOEs are associated with a first pattern for an angular field of view occupying a region of space beyond a first overall threshold distance from the structured light projector and a second pattern for an angular field of view occupying a region of space within a second overall threshold distance from the structured light projector, and the second pattern is different from the first pattern; and
- a light source that illuminates the selected DOE, the illuminated DOE generating a first structured light pattern; and
- a projection assembly that projects the first structured light pattern into a local area.

11. The structured light projector of claim 10, wherein the diffractive optical unit comprises a plate configured to spin in accordance with the depth instructions, and the plurality of DOEs are mounted on the plate.

12. The structured light projector of claim 11, wherein the plate is configured to continuously spin at a speed specified in accordance with the depth instructions.

13. The structured light projector of claim 10, wherein the diffractive optical unit selects a DOE of the plurality of DOEs for illumination by the light source in accordance with the depth instructions.

14. The structured light projector of claim 10, wherein the plurality of DOEs are in an ordered sequence, and the diffractive optical unit selects each of the plurality of DOEs in accordance with the ordered sequence.

15. The structured light projector of claim 10, wherein each of the DOEs is associated with a different structured light pattern.

16. The structured light projector of claim 10, wherein some of the DOEs are associated with a same structured light pattern.

17. The structured light projector of claim 10, wherein the first pattern is a dot pattern and the second pattern is a line pattern.

18. The structured light projector of claim 10, wherein the structured light pattern corresponding to a DOE is selected from a list including: dot pattern, line pattern, sinusoid pattern, grid pattern, multi-tone pattern, diffuse light, other types of structured light patterns, or some combination thereof.

* * * * *